No. 761,525. PATENTED MAY 31, 1904.
G. MITCHELL.
SLAG CAR.
APPLICATION FILED JULY 1, 1902.
NO MODEL. 3 SHEETS—SHEET 1.

WITNESSES
INVENTOR
G. Mitchell
Attorney

No. 761,525. PATENTED MAY 31, 1904.
G. MITCHELL.
SLAG CAR.
APPLICATION FILED JULY 1, 1902.
NO MODEL. 3 SHEETS—SHEET 2.

WITNESSES
E. J. Nottingham
G. F. Downing

INVENTOR
G. Mitchell
By H. A. Seymour
Attorney.

No. 761,525. PATENTED MAY 31, 1904.
G. MITCHELL.
SLAG CAR.
APPLICATION FILED JULY 1, 1902.
NO MODEL. 3 SHEETS—SHEET 3.
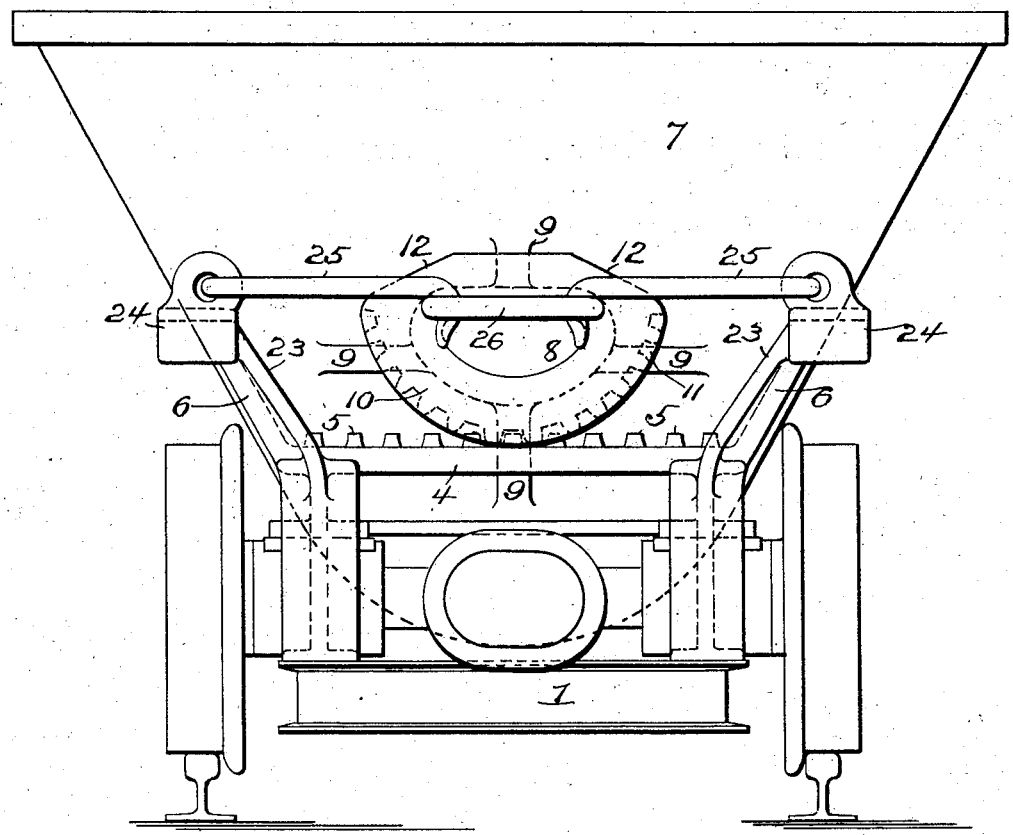

No. 761,525. Patented May 31, 1904.

UNITED STATES PATENT OFFICE.

GEORGE MITCHELL, OF NACO, ARIZONA TERRITORY.

SLAG-CAR.

SPECIFICATION forming part of Letters Patent No. 761,525, dated May 31, 1904.

Application filed July 1, 1902. Serial No. 113,929. (No model.)

*To all whom it may concern:*

Be it known that I, GEORGE MITCHELL, a resident of Naco, in the county of Cochise and Territory of Arizona, have invented certain new and useful Improvements in Slag-Cars; and I do hereby declare the following to be a full, clear, and exact description of the invention, such as will enable others skilled in the art to which it appertains to make and use the same.

My invention relates to an improved slag-car, and more particularly to a dumping-car of this character, the object of the invention being to provide a car from which the slag or other contents can be slowly poured or rapidly dumped, as desired, and, further, to so construct and mount the slag bowl or receptacle to make the same top-heavy when full and bottom-heavy when empty, thus permitting the bowl when full and released from its retaining mechanism to fall to a position to dump and when empty return to its normal upright position.

With these objects in view the invention consists in certain novel features of construction and combinations and arrangements of parts, as will be more fully hereinafter described, and pointed out in the claims.

Figure 1:
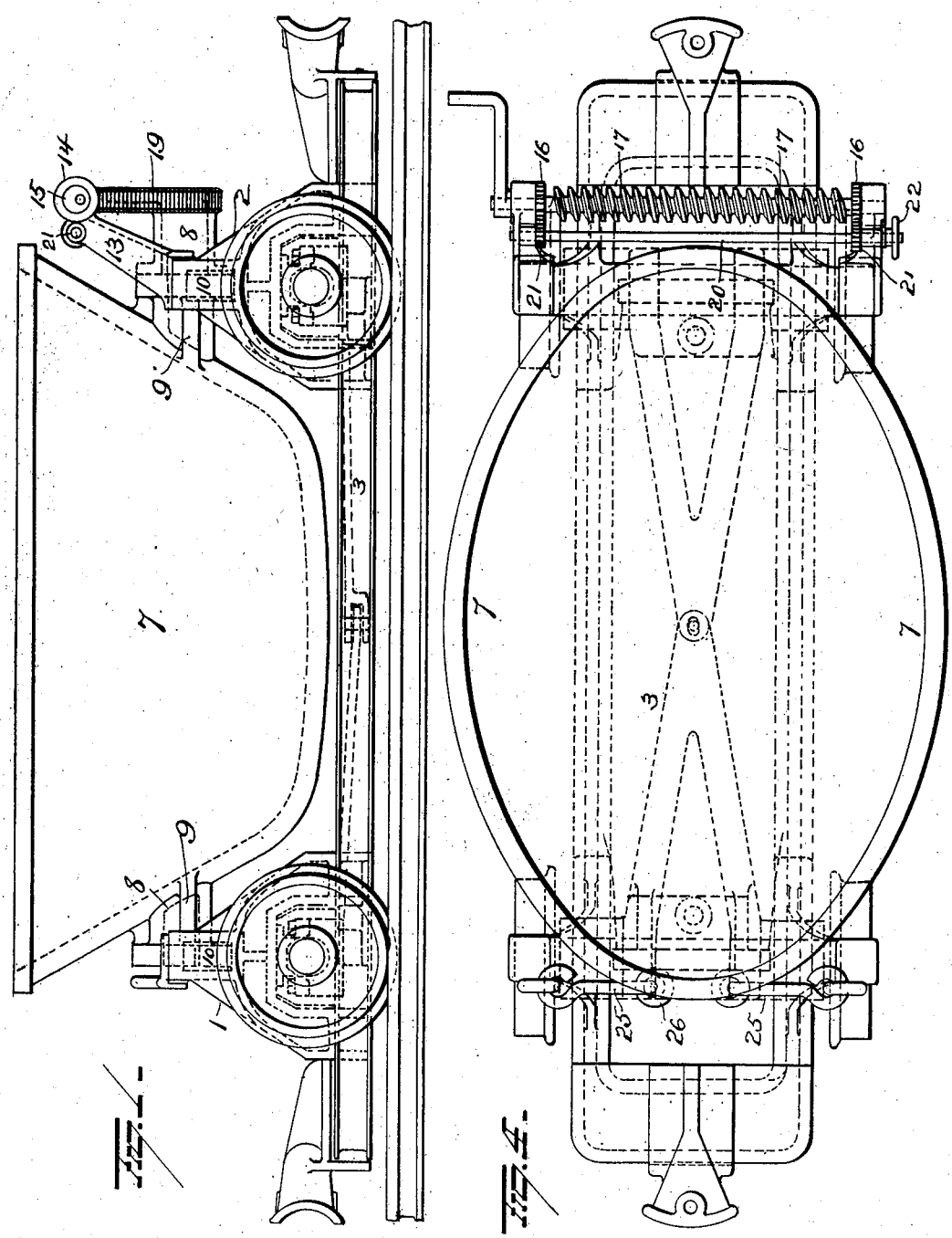
Figure 2:
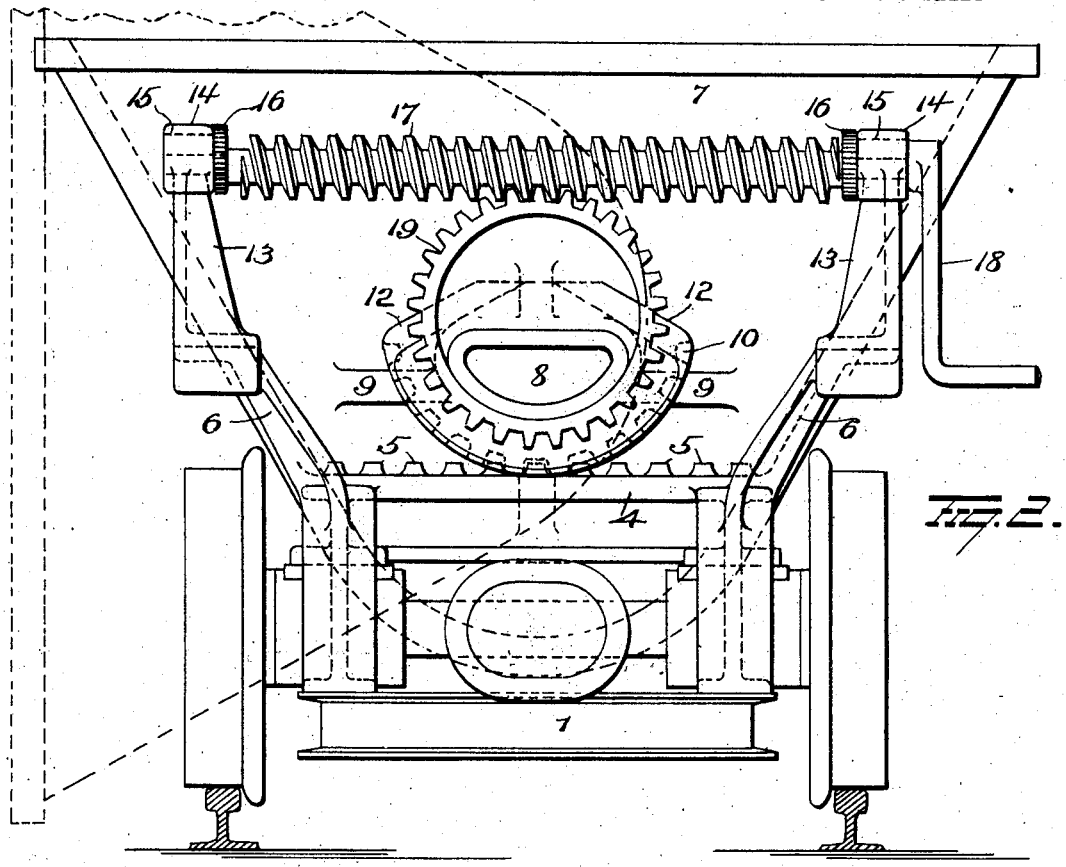
Figure 5:
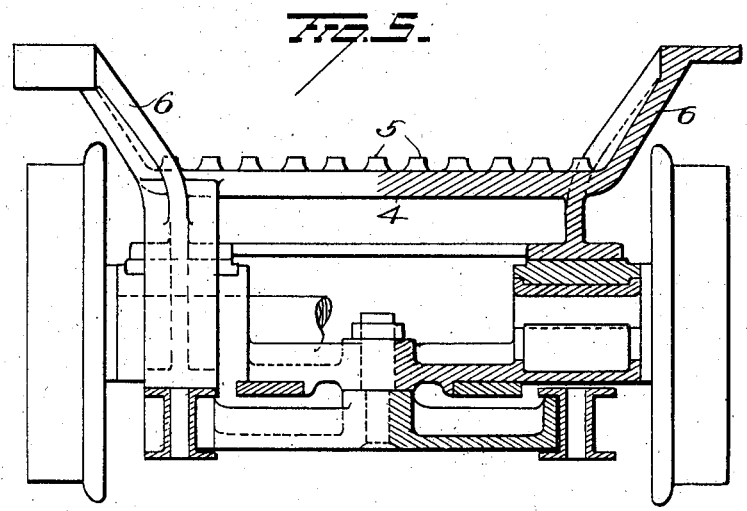

In the accompanying drawings, Figure 1 is a side view illustrating my improvements. Figs. 2 and 3 are views of opposite ends of the car. Fig. 4 is a top plan view, and Fig. 5 is a view in section, of a truck.

1 and 2 represent the trucks of the car, connected by the draft-rod 3 and provided with suitable couplings, as shown. The trucks are each made with platforms or supports 4, having a toothed rack 5 in the center thereof, and provided at their ends with upwardly and outwardly projecting arms 6, which serve as stops to limit the turning of the bowl or receptacle 7, as will hereinafter appear.

The bowl or receptacle 7 is of a general elliptical or semi-oval shape of greatest area at its top and tapering or inclining inward to its bottom and provided at its ends with integral semicylindrical trunnions 8, strengthened by ribs 9, and located in such position that when the bowl or receptacle is full of slag the cubic feet of slag in the bowl above the trunnions will outweigh that in the lower portion and make the same top-heavy; but when the bowl is empty the weight of metal below the trunnions is sufficient to overbalance the upper half thereof and maintain it in an upright position.

On trunnions 8 segments 10 are secured or made integral and support the bowl or receptacle upon platforms 4, said segments made with notches 11 to receive the teeth of racks 5 and provided with flat faces 12, adapted when the bowl is thrown to its dumping position to rest against arms 6 and prevent the bowl being thrown too far over.

On the arms 6 of truck 2 brackets 13 are secured and provided at their upper ends with bearings 14 for the journals 15 of gear-wheels 16, and these journals 15 are cored eccentrically to form bearings for the journals of a worm 17 to be turned by a crank-arm 18 on one end thereof. This worm 17 meshes with a worm-wheel 19, secured to or made integral with trunnion 8 to compel the turning of the trunnion and bowl when the worm-wheel is revolved. The brackets 13 also provide bearings for a shaft 20, located near worm 17, and has secured thereon gears 21, meshing with gears 16, and a suitable handhold 22 is secured on the protruding end of shaft 20 to permit its ready turning. When this shaft 20 is turned it transmits motion by means of gears 21 to gears 16, and as the journals 15 of gears 16 are turned in bearings 14 (the worm 17 being mounted eccentrically in said journals) the worm will be raised or lowered and thrown out of or into mesh with the worm-wheel 19, and hence permit the bowl to be gradually tilted to pour the slag or suddenly thrown over to dump the entire contents at one movement.

To secure the bowl in an upright position and prevent possibility of its accidental tilting, the truck 1 is made with flared standards 23, supporting perforated brackets 24, in which hooks 25 are hinged and adapted to engage eyebolts 26 on the trunnion 8 and secure the bowl rigidly in an upright position. These hooks must, of course, be released before the bowl can be tilted or dumped.

In operation when it is desired to tilt the bowl to slowly pour off all or a portion of its contents the hooks 25 are first released and the worm 17 turned by crank-arm 18, and as the worm 17 is in mesh with worm-wheel 19 the latter will be slowly revolved in either direction, according to the side of the track on which the contents are to be dumped. The turning of worm-wheel 19, which is secured to trunnion 8, moves segments 10 on the platforms 4, the engagement of racks 5 with the notches 11 in the segments preventing possibility of slipping and insuring an even tilting of the bowl. When the bowl is moved to its extreme tilting or dumping position, the flat faces 12 of the segments 10 will be moved against arms 6 on platforms 4 and the bowl held against further movement. When the car is empty, the operator turns handhold 22 to revolve shaft 20 and gears 21 16 to move the worm 17 (which is eccentrically mounted in the journals 15 of gears 16) out of mesh with worm-wheel 19 and permit the heavier lower end of the bowl to overbalance the upper end and swing the bowl to its upright position. If preferred, the bowl can be returned to its upright position by turning worm 17 in the reverse direction from that employed to tilt it.

As heretofore stated, owing to the peculiar semi-oval shape of the bowl and the location of the trunnions 8 thereon the bowl will be made top-heavy when full, as the cubic feet of slag above the trunnions will be in excess of that below, and hence when it is desired to rapidly dump the entire contents of the bowl the worm 17 can be thrown out of mesh with worm-wheel 19, as above explained, when the top-heavy bowl will fall to its dumping position and empty, and when the contents have all escaped the bowl will right itself, owing to the greater weight of metal below the trunnions.

A great many slight changes might be made in the general form and arrangement of the several parts described without departing from my invention, and hence I do not limit myself to the precise construction set forth, but consider myself at liberty to make such slight changes and alterations as fairly fall within the spirit and scope of my invention.

Having fully described my invention, what I claim as new, and desire to secure by Letters Patent, is—

1. In a dumping-car, the combination with a receptacle pivotally supported and top-heavy when full, of a worm-wheel connected with the receptacle, a worm to turn said worm-wheel and tilt the receptacle, eccentric supports for said worm, and means for turning said supports to throw the worm out of engagement with the worm-wheel to permit the receptacle to dump.

2. In a dumping-car, the combination with a receptacle pivotally supported and top-heavy when full, of a worm-wheel connected with the receptacle, a worm to turn said worm-wheel and tilt the receptacle, gear-wheels, in the journals of which the worm is eccentrically mounted, a shaft, gears thereon meshing with the first-mentioned gears, and means on the shaft to permit its turning and move the worm out of engagement with the worm-wheel and allow the receptacle to dump.

3. In a dumping-car, the combination with supporting-trucks having platforms thereon and racks on said platforms, of a receptacle, trunnions thereon, notched segments on said trunnions to move on the platforms and racks, arms on the platforms limiting the movement of the segments, a worm-wheel on one trunnion, a worm engaging said worm-wheel to turn the same and roll the segments on the platforms to tilt the car, and hooks carried by one truck to engage eyes on the receptacle and secure the same in an upright position.

In testimony whereof I have signed this specification in the presence of two subscribing witnesses.

GEORGE MITCHELL.

Witnesses:
A. W. BRIGHT,
S. G. NOTTINGHAM.